United States Patent
Lebed

(10) Patent No.: US 11,148,368 B2
(45) Date of Patent: Oct. 19, 2021

(54) APPARATUS FOR ADDITIVE MANUFACTURING AND USE OF THE APPARATUS

(71) Applicant: Siemens Aktiengesellschaft, Munich (DE)

(72) Inventor: Yaroslav Lebed, Berlin (DE)

(73) Assignee: Siemens Energy Global GmbH & Co. KG, Munich (DE)

(*) Notice: Subject to any disclaimer, the term of this patent is extended or adjusted under 35 U.S.C. 154(b) by 361 days.

(21) Appl. No.: 16/302,654

(22) PCT Filed: Jun. 1, 2017

(86) PCT No.: PCT/EP2017/063245
§ 371 (c)(1),
(2) Date: Nov. 18, 2018

(87) PCT Pub. No.: WO2017/215921
PCT Pub. Date: Dec. 21, 2017

(65) Prior Publication Data
US 2019/0126555 A1    May 2, 2019

(30) Foreign Application Priority Data

Jun. 13, 2016 (EP) .................. 16174163

(51) Int. Cl.
*B29C 64/35* (2017.01)
*B33Y 30/00* (2015.01)
(Continued)

(52) U.S. Cl.
CPC ............. *B29C 64/35* (2017.08); *B08B 7/02* (2013.01); *B22F 12/00* (2021.01); *B29C 64/20* (2017.08);
(Continued)

(58) Field of Classification Search
None
See application file for complete search history.

(56) References Cited

U.S. PATENT DOCUMENTS 9,486,962 B1 * 11/2016 Dugan ............... B33Y 40/00
2005/0072717 A1 * 4/2005 Purohit .............. B07B 1/46
209/309

(Continued)

FOREIGN PATENT DOCUMENTS

CN 104525961 A 4/2015
CN 105170988 A 12/2015
(Continued)

OTHER PUBLICATIONS

EP search report dated Dec. 21, 2016, for corresponding EP patent application No. 16174163.2.
(Continued)

*Primary Examiner* — Abbas Rashid
*Assistant Examiner* — Paul Spiel

(57) ABSTRACT

An apparatus for additive manufacturing includes a platform comprising a fixing device for fixing a component to the platform, wherein the platform is configured to vary an orientation of the component over an angle of at least 360° according to at least one spatial direction, and an actuation device for mechanically actuating the platform at a predefined frequency.

6 Claims, 2 Drawing Sheets

(51) Int. Cl.
    *B33Y 40/00*     (2020.01)
    *B33Y 10/00*     (2015.01)
    *B29C 64/20*     (2017.01)
    *B29C 64/241*    (2017.01)
    *B08B 7/02*      (2006.01)
    *B22F 12/00*     (2021.01)
    *B22F 3/24*          (2006.01)
    *B65G 65/23*         (2006.01)
    *B22F 10/10*         (2021.01)

(52) U.S. Cl.
    CPC ............ *B29C 64/241* (2017.08); *B33Y 10/00* (2014.12); *B33Y 30/00* (2014.12); *B33Y 40/00* (2014.12); *B22F 10/10* (2021.01); *B22F 2003/247* (2013.01); *B22F 2202/01* (2013.01); *B22F 2999/00* (2013.01); *B65G 65/23* (2013.01); *Y02P 10/25* (2015.11)

(56) References Cited

U.S. PATENT DOCUMENTS

| | | |
|---|---|---|
| 2009/0283109 A1 | 11/2009 | Moussa et al. |
| 2009/0283119 A1 | 11/2009 | Moussa et al. |
| 2012/0238415 A1 | 9/2012 | Crawford |
| 2016/0074940 A1* | 3/2016 | Cote .................. B33Y 40/00 134/23 |
| 2016/0279871 A1 | 9/2016 | Kerl et al. |

FOREIGN PATENT DOCUMENTS

| | | |
|---|---|---|
| CN | 105458264 A | 4/2016 |
| DE | 102013223407 A1 | 5/2015 |
| DE | 202016003042 U1 | 7/2016 |
| EP | 2910362 A1 | 8/2015 |
| FR | 2452979 A1 | 10/1980 |
| WO | 2015193403 A1 | 12/2015 |

OTHER PUBLICATIONS

International search report and written opinion dated Aug. 21, 2017, for corresponding PCT/EP2017/063245.
Manning, Bruce et al, "Bruker D8 Advance Powder XRD Instrument Manual and Standard Operating Procedure (SOP)", pp. 1-22, Aug. 16, 2006, XP055328765; retrieved from the Internet: URL:http://files.instrument.eom.cn/bbs/upfile/20087511723.pdf.

* cited by examiner

APPARATUS FOR ADDITIVE MANUFACTURING AND USE OF THE APPARATUS

CROSS REFERENCE TO RELATED APPLICATIONS

This application is the US National Stage of International Application No. PCT/EP2017/063245 filed Jun. 1, 2017, and claims the benefit thereof. The International Application claims the benefit of European Application No. EP16174163 filed Jun. 13, 2016. All of the applications are incorporated by reference herein in their entirety.

FIELD OF INVENTION

The present invention relates to an apparatus for additively manufacturing and a corresponding use of the apparatus.

The term "additive" shall particularly denote a layer-wise, generative and/or bottom-up manufacturing process. The additive manufacturing as described herein advantageously relates to powder-bed manufacturing methods.

BACKGROUND OF INVENTION

Powder bed manufacturing techniques such as selective laser melting (SLM), electron beam melting (EBM) or selective laser sintering (SLS) are relatively well known methods for fabricating, prototyping or manufacturing parts or components from a bed of e.g. a powdery or granular base material. Conventional apparatuses or setups for such methods usually comprise a build platform on which the component is built layer-by-layer after the feeding of a layer of the base material which may then be melted, e.g. by the energy of a laser or electron beam and subsequently solidified. The layer thickness is determined by the operation of a wiper that moves, e.g. automatically, over the powder bed and removes excess material. Typical layer thicknesses amount to 20 µm or 40 µm. During the manufacture, said beam scans over the surface and melts the base material in selected areas which may be predetermined by a CAD-file according to the geometry of the component to be manufactured.

A method of additive manufacturing is known from EP 2 910 362 A1, for example.

A particular challenge concerns internal surfaces or complex, convoluted or intricate passageways or cavities, such as cooling channels of additively manufactured components, wherein base material remaining or trapped in the respective spaces is required to be removed, e.g. after the manufacture.

Depending on the complexity of the inner geometry, the removal of excess base material from an inside of the component poses significant drawbacks to the manufacturing, particularly, as additively formed complex geometries are often full of powder and the respective components may be heavy and the passages or openings may be narrow.

Particularly when the excess powder cannot be removed sufficiently after the additive manufacture of the component, a poor quality or functionality of the component results, e.g. as said material may block the passages, especially when a further heat treatment is carried out.

Currently, powder may be removed from internal spaces of an additively manufactured component in that small or thin tools are used or vacuum cleaners in order to remove the powder. If the respective component is fairly heavy, e.g. an operator of the additive manufacturing machine may need to use the hands and physically turn the part and/or shake it in order to get the powder out. However, these trials often result in poor removal results.

SUMMARY OF INVENTION

It is therefore an object of the present invention to provide means by which an improved additively manufactured component can be provided. Particularly, by means of corresponding technical means, a solution is provided for removing (excess) powder e.g. remaining from an additive manufacture from an internal passageway of the component.

The mentioned object is achieved by the subject-matters of the independent claims. Advantageous embodiments are subject-matter of the dependent claims.

An aspect of the present invention relates to an apparatus for additive manufacturing, particularly the additive manufacture of the component, comprising a platform, further comprising a fixing means, such as a fastener, for fixing the component to the platform, wherein the platform is configured to vary an orientation of the component (fixed to the platform) and/or platform over or around an angle of at least 360° according to at least one spatial direction.

An orientation or variation of the orientation may relate to a rotational axis, such as a predefined rotational axis or spatial direction.

The component is advantageously an additively manufactured or additively manufacturable component. The term "component" may be used synonymously with an additively manufactured structure for said component.

The apparatus further comprises an actuation means for mechanically actuating the platform at a predefined frequency or frequency range.

The platform may relate to a table or base plate of the apparatus to which the component is expediently fixable by the fixing means.

The apparatus allows for an efficient removal of excess base material or powder from internal cavities of complex components as described above.

The platform is further configured to vary an orientation of the component or structure thereof over an angle of at least 360° according to two, advantageously linearly independent or orthogonal, spatial directions. This allows advantageously for a versatile application of the apparatus, wherein, when the apparatus and/or the platform is adjusted to the right orientation, e.g. in space, a powdery base material being trapped anyhow in the component may be expediently removed from the corresponding cavity.

In an embodiment, the apparatus is shaker or shaking table.

In an embodiment, the apparatus and/or the actuation means is configured to allow for an actuation of fairly heavy additively manufactured components, e.g. components weighing several tens of kilograms.

In an embodiment, the apparatus is configured such that, by the mechanical actuation of the platform, powdery base material contained in an, e.g. intricate or convoluted cavity of the component, may be removed from or shaken out of said cavity.

In an embodiment the actuation means is driven by air pressure. This may advantageously allow for a powerful and/or fast or frequent actuation performance necessary for the described removal.

In an embodiment the actuation means is driven by piezoelectric and/or electromechanical means, e.g. comprising an unbalanced motor. These means may be applied alternatively or in addition to the mentioned air pressure driven actuation in order to further enhance the performance of the apparatus for the described purposes.

In an embodiment, the vibration means comprises a first vibration generator being configured for actuating the structure and/or the base material at a first frequency or frequency range.

In an embodiment, the vibration means comprises a second vibration generator being configured for actuating the structure and/or the base material at a second frequency or frequency range.

In an embodiment the first frequency and the second frequency are different.

In an embodiment the first vibration generator and the second vibration generator are different.

In an embodiment, the first vibration generator and the second vibration generator are independently controlled or controllable.

In an embodiment, the first frequency is chosen from a first frequency range. Thus, advantageously, an actuation or agitation in the first frequency range may be achieved for the intended powder removal.

In an embodiment, the second frequency is chosen from a second frequency range. Thus, advantageously, an actuation or agitation in the second frequency range may be achieved.

In an embodiment, the first frequency range and the second frequency range are disjunct. This is an expedient embodiment, as—in this way—a broad frequency spectrum may be covered for an expedient, efficient or versatile removal of excess base material.

In an embodiment, the first vibration generator is a low-frequency, e.g. high impact or momentum, generator. According to this embodiment, the actuation means may be configured for the actuation of particularly heavy structure or components, for the actuation of which a higher momentum and/or power is required. Accordingly, the actuation means may be tailored for the actuation at larger amplitudes for example. This may be required for example when the additively manufactured part or component is heavy, internal spaces or cavities are quite bulky and/or a large amount of powder has to be shaken out of the cavity.

In an embodiment, the second vibration generator is a high-frequency, e.g. low impact or momentum, generator. According to this embodiment, the actuation means may be configured for the actuation of e.g. lighter components, for the actuation of which predominantly the frequency is crucial and only little momentum or power is necessary. Accordingly, the actuation means may be tailored for the actuation at high frequencies and small amplitudes only. This may be required for example when the additively manufactured component is rather small and also the internal spaces from which the powder has to be removed are small and possibly intricate or labyrinthine.

In an embodiment, the fixing means and/or the apparatus comprises a damping mechanism which—though allowing the vibration of the component—is configured to prevent any or an undue or excessive transfer of vibration from the structure and/or the component to the fixing means and/or the actuation means.

In an embodiment, the apparatus is configured movable. Particularly, the apparatus may comprise rollers, by means of which mobility of the apparatus may be achieved. Said rollers may be provided with individual breaks, e.g. for each roller a separate break, such that a safe operation of the apparatus may be achieved. Said rollers and/or brakes may be provided at a rack of the apparatus, for example.

In an embodiment, the apparatus comprises a rack, advantageously a rack at which the actuation means and the platform are provided. The rack may be or comprise a frame which may be designed to allow for stabilizing and/or orienting the component via the platform at various expedient spatial orientations or angles. E.g. the rack may comprise elongated levers in order to turn and shake even heavy and big parts for the described purposes.

The apparatus further comprises a blocking mechanism being configured such that, during a variation of the orientation of the platform, the platform is, e.g. stepwise, engageable. Said engagement may be realized via a snap means or snap features, e.g. a spring biased snap feature, for a reliable blocking of the platform.

A further aspect of the present invention relates to a use of the apparatus for removing of a, advantageously powdery, base material from a cavity of an additively manufactured component. Said removal advantageously relates to shaking out of the base material which may be an excess base material in the additive manufacture of the component, of or from the cavity.

The mentioned use or process of removing the base material from said cavity may comprise varying the orientation of the component such that the base material trickles of the cavity, e.g. driven by gravitational forces. Thereby, the component may repeatedly turned or rotated back and forth such that any base material can escape from the cavity and overcome the obstacles of the internal passageways.

Advantages relating to the described method, use and/or the component may as well pertain to the apparatus and vice versa.

BRIEF DESCRIPTION OF THE DRAWINGS

Further features, expediencies and advantageous refinements become apparent from the following description of the exemplary embodiment in connection with the Figures.

DETAILED DESCRIPTION OF INVENTION

Figure 1:
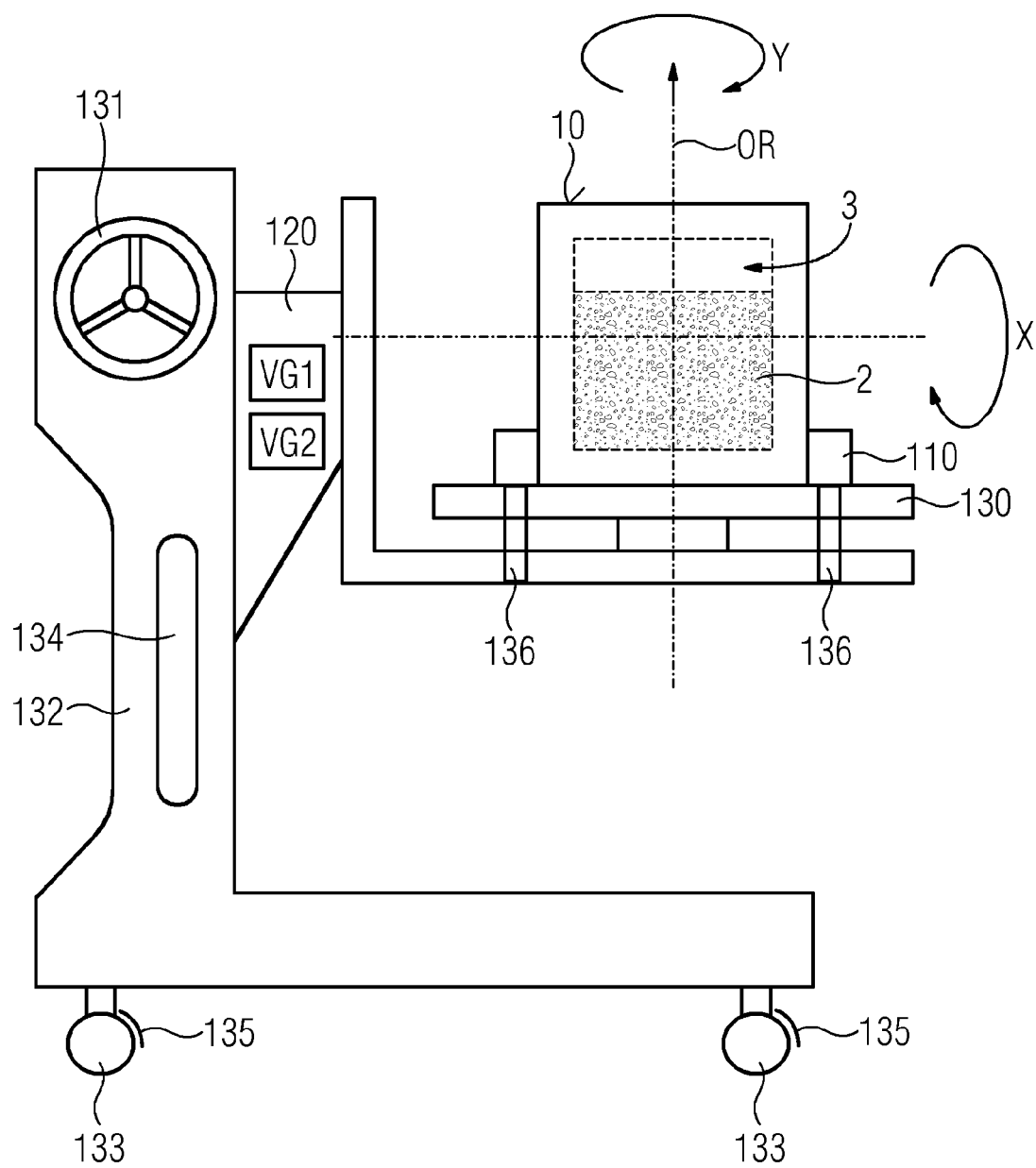
FIG. 1 shows a schematic side view of an apparatus according to the present invention.

Like elements, elements of the same kind and identically acting elements may be provided with the same reference numerals in the Figures.

FIG. 1 shows an apparatus 100. The apparatus 100 may be shaker or shaking table. The apparatus 100 advantageously relates to a tool or add-on for the additive manufacture of a component 10 or structure, advantageously by powder-bed based-techniques. In FIG. 1, a component 10 is particularly fixed to the apparatus 100.

The component 10 is advantageously a component for an application in flow path hardware of turbo machines, such as gas turbine. The component 10 is advantageously manufactured from superalloys, such as nickel or cobalt-based superalloys for gas turbines.

For fixing the component 10, the apparatus 100 comprises a platform 130 in turn comprising a fixing means 110. The fixing means 110 may be or comprise a fastener such as the bench vice, for fixing the component 10, advantageously after the structure 1 has been additively assembled or manufactured.

The platform 130 may be or comprise a rotary table onto which the component 10 and/or structure 1 may be mounted, expediently by means of the described fixing means 110.

The fixing means 110 may comprise at least two clamps as indicated in the Figures. Also, the fixing means 110 may comprise any expedient fixation features known to a skilled person, such as a clutch, grippers, an arbor or mandrel, screws, bolts, a caliper, or any other means suitable for fixing the component, advantageously according to a plurality of different spatial orientations.

Further, the apparatus 100 comprises an actuation means 120, such as vibration or oscillatory means. The actuation means 120 is advantageously configured such that a structure or part of the component and/or the component 10 itself may be mechanically actuated, e.g. to a periodic actuation, such as a vibration or oscillation, at a predefined frequency range. Said frequency range advantageously encompasses a first frequency F1 or first frequency range and a second frequency F2 or second frequency range.

The actuation means 120 may be driven by air pressure or comparable means. Additionally or alternatively, the actuation means may be driven by piezoelectrically and/or electromechanically, comprising the respective technical facilities known to a skilled person.

FIG. 1 shows the apparatus 100 according to an orientation OR of the component 10.

The platform 130 is advantageously configured such that the component—mounted to it—may be rotated around an axis Y (vertical axis in FIG. 1). Additionally, the platform 130 is advantageously configured such that the component 10 may as well be rotated or turned around an axis X (horizontal axis). Thus, the structure 1 and/or the component 10 may be rotated around two linearly independent axes of movement or rotation, advantageously over and an angle of 360° each. Accordingly, in theory, any excess base material may be removed from or shaken out of a cavity of the component, when the structure is shaken consecutively according to a plurality of different spatial orientations by the actuation means 120.

The fixing means 110 expediently effects a fixation of the component 10 on or at e.g. the actuation means 120 and/or the apparatus 100. Therefore, the platform 130 may be provided with an angled suspension (not explicitly indicated). By a said suspension, the platform 130 is advantageously also rotatable around the spatial direction or axis X. Thus, the component 10 may be oriented upside down or according to any perceivable spatial orientation.

The platform 130, as described, may further be adjustable by an electric or electromechanical drive, for example.

The cavity 3 of the component 10 as shown in FIG. 1, is particularly shown at least partly filled with a base material 2, advantageously of a powdery and/or granular structure. The component 10 has advantageously been manufactured out of that base material 2, wherein the base material remaining in the cavity may be an excess base material, advantageously remaining from the manufacture, as may be usual in the additive fabrication of components by means of powder bed methods.

The actuation means 120 is expediently provisioned for an actuation of or agitation of the platform 130 at a predefined frequency of frequency range, particularly for an effective removal of the base material, after the component has been manufactured. The removal of a powder or powdery base material from complex inner cavities of additively manufactured components poses a significant challenge, as access powder remaining or trapped in the said cavities may—in the case of turbine components—adversely affect or even completely impede functionality, such as cooling, in the as-manufactured component.

Although this is not explicitly indicated in the Figures, the presented inventive method may comprise the application and/or adjustment of any expedient or reasonable frequency or frequency range (cf. above). Said frequency may e.g. be known or easy to determine by experimentation of a skilled person.

Particularly, the applied frequencies are advantageously chosen by an operator of the apparatus 100—possibly depending on a particle fraction, the type of base material and the dimensions of the component. The shaking frequency or actuation of the component 10 for powder removal may extend over a large frequency range.

During the actuation, an orientation of the component—as mentioned above—is advantageously varied such that excess material or any base material remaining in the cavity, can efficiently be removed, from convoluted or intricate regions of the cavity (for the sake of simplification, the cavity 3 is only depicted with a simple geometry).

Although this is not explicitly shown in FIG. 1, the cavity 3 expediently comprises an opening (cf. numeral 5 in FIG. 2) which is advantageously necessary for the functionality of the cavity 3 of the component 10 as well as for the described powder removal.

In case that the described opening 5 of the cavity is not already facing upwards such that the base material is trapped inside, the apparatus 100 may need to be readjusted or changed in its orientation (cf. orientation OR' in FIG. 2) the platform 130 turned or rotated such that the opening 5 is directed downwards, for example.

Further, the apparatus 100 may comprise a blocking mechanism. The blocking mechanism may comprise blocking features as indicated by 136 in FIG. 1. The blocking mechanism is advantageously configured such that, during a variation of the orientation (cf. FIG. 2 below) and/or during actuation, the platform 130 is, e.g. stepwise engageable, e.g. via the blocking features 136. The blocking mechanism 136 is advantageously intended for a reliable blocking of the platform 130 for safety reasons. The blocking mechanism and/of the blocking features may comprise a snap functionality or, e.g. be spring-biased, snap feature, for a releasable blocking of the platform, e.g. with respect to further components of the apparatus 100.

The actuation means 120, as described above advantageously comprises a first vibration generator VG1 being configured for actuating the component 10 and/or the base material 2 at the first frequency F1. The first vibration generator VG1 may allow for an actuation and/or vibration of the component for large amplitudes and/or momentums and advantageously low frequencies, which may particularly be expedient for the removal of powder from heavy parts, e.g. weighing several tens of kilograms.

The actuation means 120 advantageously further comprises a second vibration generator VG2 which is advantageously separate and independently controllable from the first vibration generator. The second vibration generator is further configured for actuating the component 10 at the second frequency F2. The second vibration generator VG2 may particularly allow for a removal of any remaining base material in the cavity 7 and for high frequencies and advantageously smaller amplitudes, momentums or impacts, e.g. possibly necessary for lighter smaller components.

Although this is not explicitly indicated, the apparatus 100 and/or the fixing means 110 may comprise a damping mechanism which is advantageously configured to allow vibration of the component 10, however preventing excessive or adverse transfer of vibrations from the component to the fixing means 110 and/or the actuation means 120.

Further, it is shown in FIG. 1 that the apparatus 100 comprises a rack 132. The rack 132 may comprise a frame, e.g. from steel in order to provide for a stabilizing base e.g. for further components of the apparatus 100. The fixing means 110 are provided in an upper part of the rack 132.

For any turn or changed orientation of the component, mounted to the platform 130, a user of the apparatus 100 and/or an operator may manipulate an adjustment wheel or handle 131.

For any axis of rotation (cf. X and Y), a separate handle may be provisioned (not indicated). Said handle(s) may be connected or coupled to the platform 130 via a worm gear, for example.

The apparatus 100 is advantageously configured movable. Accordingly, the apparatus 100 may comprise rollers 133. The rollers 133 may be mounted to the rack 132, as described above. A number of four rollers 133 may e.g. be provisioned. Said rollers 133 may be provided with brakes 135, e.g. such that each of the rollers 133 may individually be blocked for safety reasons.

The apparatus 100 further comprises a cleaning means 134, such as a cleaning means driven by pressurized air, for example. Said cleaning means may comprise a hose and/or nozzle or any other expedient features for a thorough removal of base material 2 e.g. from the surfaces of the component 10.

Figure 2:
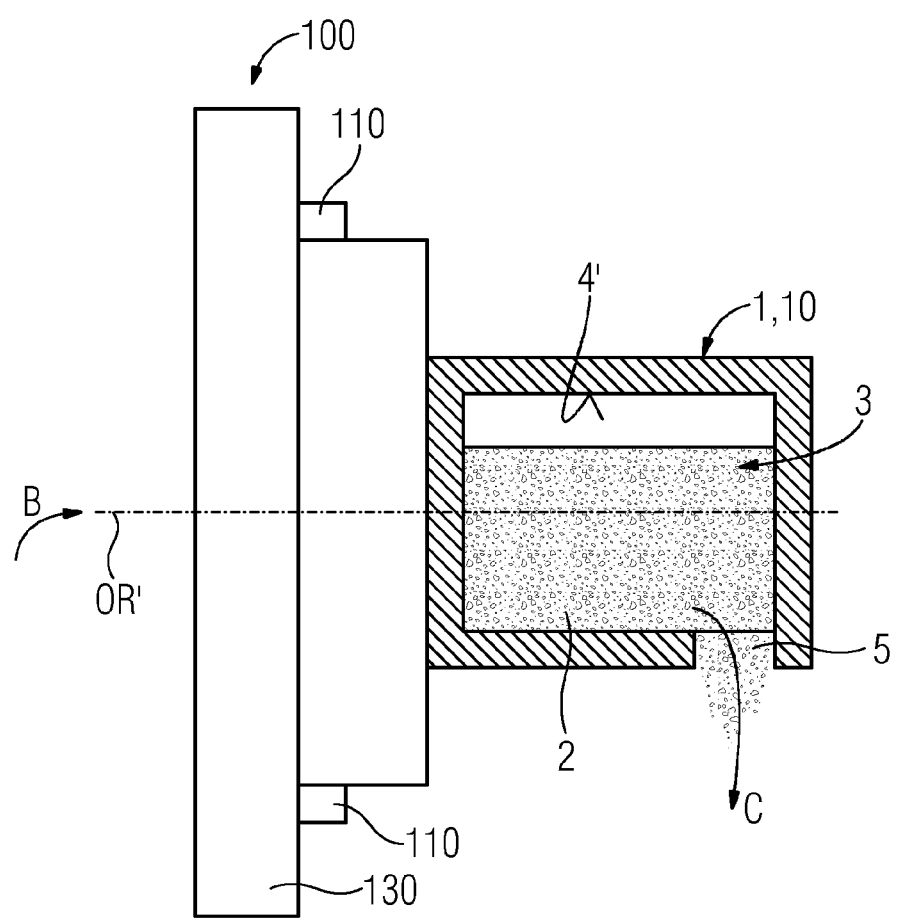
FIG. 2 shows a schematic sectional view of a setup indicating a use of the apparatus of FIG. 1.

FIG. 2 indicates schematically and in form of a partial image of a setup of the platform 130 and the component 10 fixed to it that the component 10 has been turned or rotated (cf. arrow B) by an angle of e.g. 90° in a clockwise sense, i.e. from the orientation OR to the indicated orientation OR'.

The component 10 may comprise a base section 11. Accordingly, the component 10 is advantageously an at least partly hollow component of a gas turbine, such as a turbine airfoil, vane or blade, which is advantageously to be additively manufactured with an internal cavity. Said cavity may serve as a cooling channel for an efficient cooling of the component e.g. during an operation of the turbine. An internal space, or cavity is again denoted by numeral 3 indicating exemplarily e.g. the mentioned cooling channels.

The base section may be a root section of the turbine blade.

The component 10 further comprises an opening 5 by means of which an outside of the component 10 may communicate with the cavity 3. Through the opening 5, the base material 2 may expediently be removed from the cavity 3. To this effect, the orientation OR' allows the base material 2 to trickle out of the cavity 3 as indicated by arrow C. This is because the cavity is shaped such that—according to the mentioned orientation—the base material 2 may no longer trapped inside the cavity.

For an efficient removal of the base material 2, the present invention may comprise superposing the mentioned first frequency F1 and the mentioned second frequency F2 and/or the respective frequency ranges.

The first frequency or frequency range F1 may comprise frequencies from several mHz to 1 Hz.

Advantageously, the first frequency F1 is lower than the second frequency F2, such that the base material 2 may efficiently be removed from the cavity 3. It may be provisioned, that within the actuation of the component 10, advantageously relative to the base material 2, at the first frequency F1, the whole setup and/or the structure 1 is only actuated very slowly, but advantageously with a fairly large amplitude or momentum from one position to another.

The second frequency F2 or frequency range may span frequencies from 1 Hz to several kHz, for example.

Advantageously, the presented use of the apparatus 100 allows for a complete removal of the base material from the cavity as shown in FIG. 2 such that said cavity is advantageously free of excess powder or base material and the advantages or properties of the respective cavities or internal spaces can be exploited in the readily manufactured component.

The scope of protection of the invention is not limited to the examples given hereinabove. The invention is embodied in each novel characteristic and each combination of characteristics, which particularly includes every combination of any features which are stated in the claims, even if this feature or this combination of features is not explicitly stated in the claims or in the examples.

The invention claimed is:

1. An apparatus for additive manufacturing, comprising: a platform comprising a fixing mechanism for fixing a component of a flow path of a gas turbine to the platform, wherein the platform is configured to vary an orientation of the component over an angle of at least 360° according to two orthogonal spatial directions while the component is fixed to the platform via the fixing mechanism, an actuation mechanism for mechanically actuating the platform to vary the orientation of the component wherein the actuation mechanism comprises a first vibration generator being configured for actuating a powdery base material at a first frequency and a second vibration generator being configured for actuating the powdery base material at a second frequency being different from the first frequency, wherein the first frequency is chosen from a first frequency range and the second frequency is chosen from a second frequency range and wherein the first frequency range and the second frequency range are disjunct, and a blocking mechanism being configured such that, during a variation of the orientation of the platform, the platform is engageable via a snap-mechanism for a blocking of the platform with respect to the actuation mechanism, and wherein the apparatus is configured such that, by the mechanical actuation of the platform, the powdery base material contained in a cavity of the component being fixed to the platform is removeable from the cavity.

2. The apparatus according to claim 1, wherein the actuation mechanism is driven by air pressure.

3. The apparatus according to claim 1, wherein the actuation mechanism is driven by piezoelectric and/or electromechanical mechanism, or an unbalanced motor.

4. The apparatus according to claim 1, wherein the first vibration generator and the second vibration generator are independently controllable.

5. The apparatus according to claim 1, wherein the fixing mechanism comprises a damping mechanism which is configured to prevent a transfer of vibrations from the component to the actuation mechanism.

6. A method for removing of a powdery base material from a cavity of an additively assembled component, comprising:
using the apparatus according to claim 1 to remove the powdery base material by the mechanical actuation of the platform.

* * * * *